Figure 1:
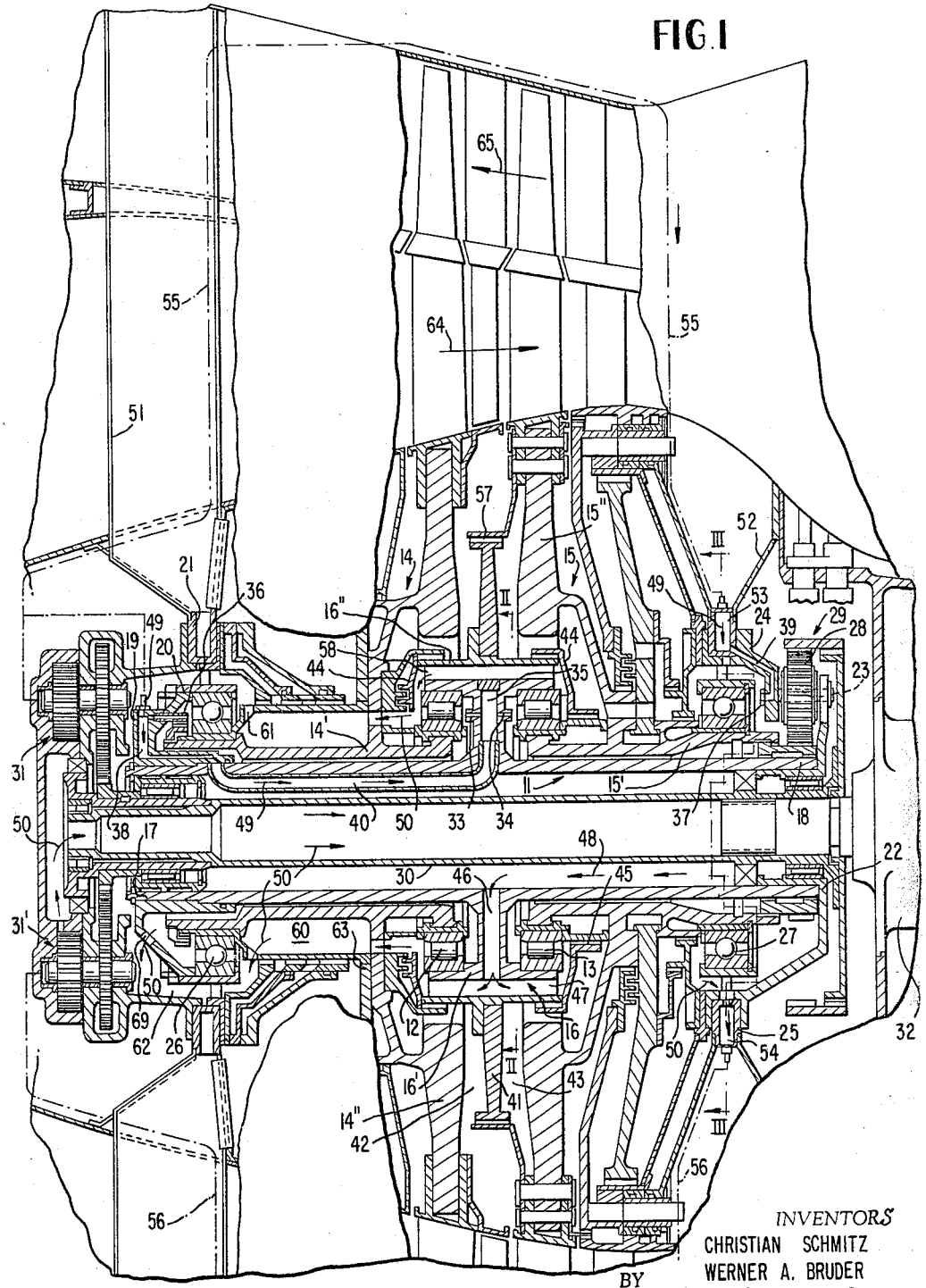

Nov. 15, 1966  C. SCHMITZ ETAL  3,285,566

FLOW MACHINE

Filed June 11, 1964  2 Sheets-Sheet 2

INVENTORS
CHRISTIAN SCHMITZ
WERNER A. BRUDER
BY
Dicke + Craig
ATTORNEYS

United States Patent Office 3,285,566
Patented Nov. 15, 1966

3,285,566
FLOW MACHINE
Christian Schmitz, Engelberg Post Schorndorf, and Werner A. Bruder, Neckarrems, Germany, assignors to Daimler-Benz Aktiengesellschaft, Unterturkheim, Germany
Filed June 11, 1964, Ser. No. 374,457
24 Claims. (Cl. 253—39)

The present invention relates to the construction of a flow machine, especially of a gas turbine drive unit, having a stationary shaft for the arrangement of the rotor bearings which shaft is connected with the outer walls of the machine housing by way of radial struts.

Gas turbine drive units are known in the prior art in which the individual rotors, which radially inwardly thereof each carry a row of air compressor blades and radially outwardly thereof a row of gas turbine blades and therebetween one coaxial ring shielding the compressed air stream against the oppositely directed gas turbine flow, are freely rotatably supported on a shaft arranged in the machine housing which is rigidly connected with the outer wall of the drive unit housing by way of radially directed support walls carrying the radially outer compressor and turbine guide blades. The support of the rotors on the shaft takes place in the prior art construction by means of roller bearings resting with the inner ring or race thereof on the shaft whereby the outer rings or races of the roller bearings rotate with the rotors. The bearing shaft is constructed hollow and serves for the conducting of compressed and cooled air for different purposes. Furthermore, a pipe is rigidly arranged within the hollow space of the bearing shaft within which the fuel is transported via an air cooler to the burners of the drive unit.

The present invention is concerned with the task to create a shaft for rotors, the hub portions of which are supported radially outwardly and to construct the same advantageously for the given application and to arrange the same appropriately within the machine housing.

In solution of the posed task, it is proposed in accordance with the present invention to provide the shaft, for the installation of the adjacent bearings of two rotors supported radially outwardly by way of the hub portions thereof, within the area of these bearings with a cylindrical extension double T-shaped in cross section. Furthermore, the bearing shaft according to the present invention is supported at the two outer ends thereof in the struts of the machine housing by way of detachably connected parts which carry the outer bearings of the rotors.

It is further proposed in accordance with another feature of the present invention to provide in the cylindrical extension of double T-shape in cross section and in the separate structural parts disposed at the ends of the shaft lubricating channels as well as to arrange lubricating supply and collecting spaces and to provide lubricating injection nozzles for the rotors.

Furthermore, the hollow space of the bearing shaft serves, within the scope of the present invention, for the transport of bearing blocking air and for the support of a shaft for the drive of the auxiliary aggregates or units of the drive unit.

Accordingly, it is an object of the present invention to provide a flow machine, particularly a gas turbine drive unit of the type described above, which obviates the drawbacks encountered with the prior art constructions by simple means.

It is another object of the present invention to provide a gas turbine drive unit in which the stationary bearing shaft and its associated structural parts are of extremely simple construction, easy to assemble, and so designed as to enable advantageous layout and appropriate accommodation within the housing.

Another object of the present invention resides in the provision of a flow machine in which the parts associated with the bearing supports of the rotors are readily assemblable and disassemblable, and in which adequate lubrication is assured by particularly effective means.

Figure 2:
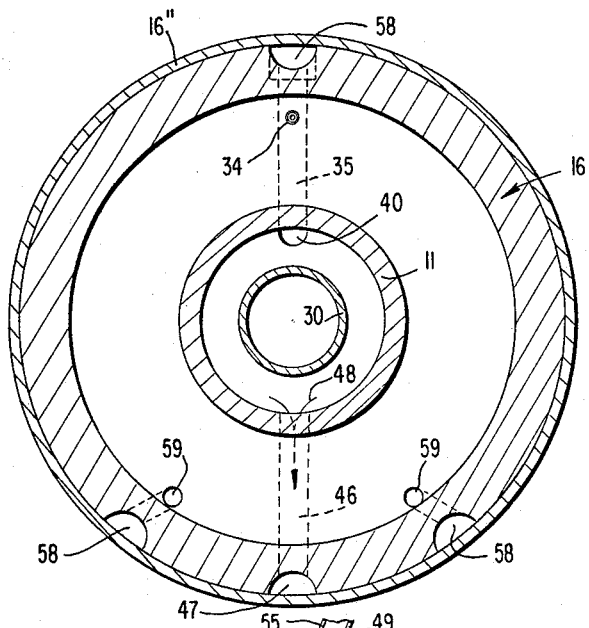
Figure 3:
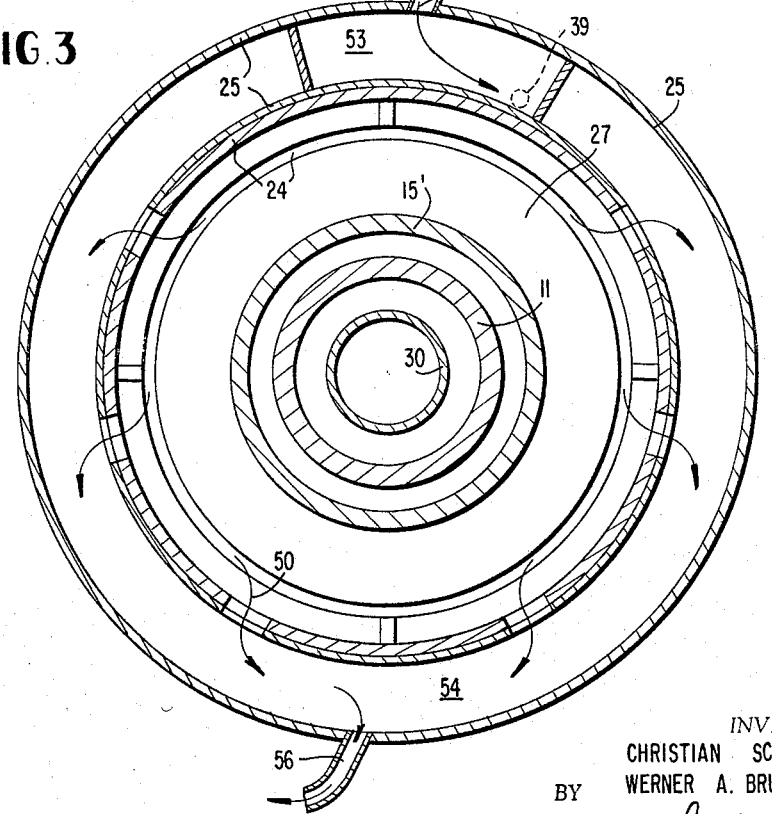

These and other objects, features and advantages of the present invention will become more obvious from the following description when taken in connection with the accompanying drawing which shows, for purposes of illustration only, one embodiment in accordance with the present invention, and wherein FIGURE 1 is a partial axial longitudinal cross sectional view through a gas turbine drive unit in accordance with the present invention;

FIGURE 2 is a partial cross sectional view, taken along line II—II of FIGURE 1, and FIGURE 3 is a partial cross sectional view taken along line III—III of FIGURE 1.

Referring now to the drawing wherein like reference numerals are used throughout the various views to designate like parts, and more particularly to FIGURE 1, a bearing shaft generally designated by reference numeral 11 is arranged within the machine or engine housing of the drive unit. The bearing shaft 11 is constructed of double-T-shape in cross section within the area of the mutually adjacent bearings 12 and 13 of the rotors generally designated by reference numerals 14 and 15. The cylindrical axial piece or extension generally designated by reference numeral 16 which is of double-T-shape in cross section serves for the accommodation of the aforementioned two bearings 12 and 13 which are supported outwardly in the radial direction on the bearing ring 16' of the axial extension 16. The two ends 17 and 18 of the bearing shaft 11 are rigidly connected by way of separate structural parts 19, 20 and 21, on the one hand, and separate structural parts 22, 23, 24 and 25, on the other, with the housing support struts 51 and 52, respectively, extending outwardly in the radial direction. The separate structural parts simultaneously serve for the arrangement and for the installation of the two outer bearings 26 and 27. The separate structural parts 22, 23, 24 and 25 at the one bearing shaft end 18 serve also for the arrangement and support of gear wheels 28 distributed over the circumference of a transmission generally designated by reference numeral 29 which is inserted between the outer end of the hub portion 15' of the rotor 15 and the outer end of the shaft 30 supported within the shaft 11. The shaft 30 in turn drives, on the one hand, pumps generally designated by reference numeral 31 for the supply of the fresh lubricant 49 as well as pumps generally designated by reference numeral 31' for sucking off the returning lubricant 50 coming from the bearings 12, 13, 26 and 27 and, on the other hand, a lubricant centrifuge 32 which serves for the separation of the air out of the returning lubricant 50 mixed with blocking air 48. The returning lubricant 50 mixed with blocking air 48 is supplied within the hollow space of the shaft 30 by one of the pumps 31' to the centrifuge 32.

Nozzles 33 and 34 are arranged at the shaft extension 16 for the bearings 12 and 13 which supply these bearings with fresh lubricant 49 and which are supplied by way of a lubricant duct or channel 35 extending radially outwardly. Lubricating nozzles 36 and 37 are also provided for the outer bearings 26 and 27 to which lead lubricating ducts or channels 38 and 39. A lubricating pipe line 40 extends within the hollow space of the bearing shaft 11 which establishes the connection between the lubricating ducts or channels 38 and 35.

As shown in particular in FIGURE 3, the structural part 25 which serves simultaneously as the base portion for the strut 52 is subdivided into chambers 53 and 54. A line 55 terminates in the supply chamber 53 which extends over the housing struts 51 and 52 and through which is conducted fresh lubricant 49. The channel 39 extends from the supply chamber 53 through the structural part generally designated by reference numeral 24 to the nozzle 37. The returning lubricant 50 from the bearing 27 collects in the chamber 54 and is sucked off or drawn off from there by one of the pumps 31' by way of a line 56.

Furthermore, return channels 58 are provided in the bearing ring 16' through which the returning lubricant 50 coming from the bearing 15 and mixed with blocking air may reach the return flow space 60. Additionally, oblique cut-in or tapped bores 59 (FIGURE 2) lead to the channels or ducts 58 in order to accelerate the discharge of the returning lubricant out of the installation space of the bearing 13. The return flow space 60 terminates in a supply nozzle 61 so that the rotary movement of the rotor 14 is further utilized for the return supply of the returning lubricant 50 out of the bearings 12 and 13. The return flow space 61 is limited, on the one hand, by the rotor hub 14' and on the other, by a cover sleeve 63. Finally, the entire return flow lubricant 50 collects in the pump space 62 in order to be conducted then through the shaft 30 to the centrifuge 32. The return lubricant quantity 50 reaches from the bearing 26 to the return flow pump space 62 by way of bores 69.

A cover sleeve 16" is rigidly mounted on the bearing ring 16'. A disk-shaped partition wall 41 is detachably secured outwardly at the cover sleeve 16" by way of a flange. The partition wall 41 carries at the outer circumference thereof one part of a labyrinth seal 57 so that mutually separated pressure spaces 42 and 43 are produced between the two adjoining rotor disks 14" and 15", whereby the latter is supplied with compressed air which has a considerably higher pressure than the air that is present in space 42 in order to obtain a thrust equalization between the larger reaction thrust produced by the compressor air stream 64 and the smaller reaction thrust produced by the gas turbine flow 65. Additionally, parts 44 of the labyrinth seal 45 are secured on both sides of the cover sleeve 16".

Furthermore, a blocking air supply line 46 extends radially outwardly in the shaft extension 16 which discharges in a blocking air distributor line 47 provided in the bearing ring 16' that leads to the labyrinth seal 45. The bearing blocking air 48 is conducted through the hollow space of the bearing shaft 11.

The described drive unit is particularly suited for installation in airplanes in the vertical position thereof.

While we have shown and described one embodiment in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A flow machine, especially gas turbine drive unit, having a relatively stationary housing means provided with outer walls and rotor means within said housing means and provided with hub means radially inwardly thereof, comprising:
   relatively fixed bearing shaft means for supporting thereon the rotor means,
   substantially radial strut means operatively connecting said bearing shaft means with the outer walls,
   said bearing shaft means having in the center region thereof a cylindrical extension of substantially double-T-shape in cross section,
   bearing means for rotatably supporting said hub means within said extension with said hub means extending into said extension on both sides thereof,
   and means including a plurality of detachably connected parts for supporting the two ends of said bearing shaft means in the radial strut means of said housing means,
   said parts also carrying the outer bearing means for the rotor means.

2. A flow machine, especially gas turbine drive unit, having a relatively stationary housing means provided with outer walls and rotor means within said housing means and provided with hub means radially inwardly thereof, comprising:
   relatively fixed bearing shaft means for supporting thereon the rotor means,
   substantially radial strut means operatively connecting said bearing shaft means with the outer walls,
   said bearing shaft means having in the center region thereof a cylindrical extension of substantially double-T-shape in cross section,
   bearing means for rotatably supporting said hub means within said extension with said hub means extending into said extension on both sides thereof,
   and means including a plurality of detachably connected parts for supporting the two ends of said bering shaft means in the radial strut means of said housing means,
   said parts also carrying the outer bearing means for the rotor means,
   the bearing shaft extension being made in one piece with the remaining part of the bearing shaft means.

3. A flow machine, especially gas turbine drive unit, having a relatively stationary housing means provided with outer walls and rotor means within said housing means and provided with hub means radially inwardly thereof, comprising:
   relatively fixed bearing shaft means for supporting thereon the rotor means,
   substantially radial strut means operatively connecting said bearing shaft means with the outer walls,
   said bearing shaft means having in the center region thereof a cylindrical extension of substantially double-T-shape in cross section,
   bearing means for rotatably supporting said hub means within said extension with said hub means extending into said extension on both sides thereof,
   and means including a plurality of detachably connected parts for supporting the two ends of said bearing shaft means in the radial strut means of said housing means,
   said parts also carrying the outer bearing means for the rotor means,
   the shaft extension being constructed as separate structural part and being securely connected with the remainder of the bearing shaft means.

4. A flow machine, especially gas turbine drive unit, having a relatively stationary housing means provided with outer walls and rotor means within said housing means and provided with hub means radially inwardly thereof, comprising:
   relatively fixed bearing shaft means for supporting thereon the rotor means, substantially radial strut means operatively connecting said bearing shaft means with the outer walls of said housing means,
   said bearing shaft means having in the center region thereof a cylindrical extension of substantially double-T-shape in cross section,
   bearing means for rotatably supporting said hub means within said extension with the hub means extending into said extension on both sides thereof,
   and means including a plurality of detachably connected parts for supporting the two ends of said bearing shaft means in the radial strut means of said housing means,
   said parts carrying the outer bearing means for the rotor means,
   said shaft extension being provided with channel means for the supply of fresh lubricant, and lubricating injection nozzle means arranged at said shaft extension into which discharge said channel means.

5. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension with the hub means extending into said extension on both sides thereof, and means including a plurality of detachably connected parts for supporting the two ends of said bearing shaft means in the radial strut means of said housing means, said parts carrying the outer bearing means for the rotor means, said shaft extension being provided with channel means for the supply of fresh lubricant, and lubricating injection nozzle means arranged at said shaft extension into which discharge said channel means, said bearing shaft means being of hollow construction, lubricating line means extending inside of said bearing shaft means, one end of said bearing shaft means being provided with lubricating supply pump means, and said lubricating line means extending from said lubricating supply pump means to the channel means extending in the shaft extension.

6. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means provided with return channel means for the returning lubricant mixed with blocking air which flows out of the rotor bearing means.

7. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means provided with return channel means for the returning lubricant mixed with blocking air which flows out of one of the rotor bearing means, the hollow space of said bearing shaft means serving for the transportation of the blocking air.

8. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means provided with return channel means for the returning lubricant mixed with blocking air which flows out of one of the rotor bearing means, the hollow space of said bearing shaft means serving for the transportation of the blocking air, at least one blocking air supply line means extending in said shaft extension and terminating in blocking air distributor line means arranged in said bearing ring means which lead to labyrinth seal means.

9. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means, and cover sleeve means placed over said bearing ring means.

10. A flow machine, especially gas turbine drive unit, having a relatively stationary housing means provided with outer walls and rotor means within said housing means and provided with hub means radially inwardly thereof, comprising:

relatively fixed bearing shaft means for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means provided with return channel means for the returning lubricant mixed with blocking air which flows out of one of the rotor bearing means, the hollow space of said bearing shaft means serving for the transportation of the blocking air, at least one blocking air supply line means extending in said shaft extension and terminating in blocking air distributor line means arranged in said bearing ring means which lead to labyrinth seal means, and cover sleeve means placed over said bearing ring means.

11. A flow machine, especially gas turbine drive unit, having a relatively stationary housing means provided with outer walls and rotor means within said housing means and provided with hub means radially inwardly thereof, comprising:

relatively fixed bearing shaft means for supporting thereon said rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means, sleeve means placed over said bearing ring means, and disk-shaped partition wall means secured on the outside of said sleeve means for producing two mutually separated pressure spaces, and one of the parts of the labyrinth seal means disposed between said pressure spaces being arranged along the outer circumference of said partition wall means.

12. A flow machine, especially gas turbine drive unit, having a relatively stationary housing means provided with outer walls and rotor means within said housing means and provided with hub means radially inwardly thereof, comprising:

relatively fixed bearing shaft means for supporting thereon said rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension on both sides thereof, and means including a plurality of detachably connected parts for supporting the two ends of said bearing shaft means in the radial strut means of said housing means, said parts carrying the outer bearing means for the rotor means, said extension including bearing ring means and web means, sleeve means placed over said bearing ring means, and disk-shaped partition wall means secured on the outside of said sleeve means for producing two mutually separated pressure spaces, and one of the parts of the labyrinth seal means disposed between said pressure spaces being arranged along the outer circumference of said partition wall means, and structural parts secured on both sides of said sleeve means to form labyrinth seal means.

13. A flow machine, especially gas turbine drive unit, having a relatively stationary housing means provided with outer walls and rotor means within said housing means and provided with hub means radially inwardly thereof, comprising:

relatively fixed hollow bearing shaft means operatively connected for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension with the hub means extending into said extension from both sides thereof, and means including a plurality of detachably connected parts for supporting the two ends of said bearing shaft means in the radial strut means of said housing means, said parts carrying the outer bearing means for the rotor means, and further shaft means supported within the hollow space of said bearing shaft means, said further shaft means serving for the transmission of the drive for different auxiliary aggregates including supply and suction pump means and a lubricant centrifuge.

14. A flow machine, especially gas turbine drive unit, having a relatively stationary housing means provided with outer walls and rotor means within said housing means and provided with hub means radially inwardly thereof, comprising:

relatively fixed hollow bearing shaft means operatively connected for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension from both sides thereof, and means including a plurality of detachably connected parts for supporting the two ends of said bearing shaft means in the radial strut means of said housing means, said parts carrying the outer bearing means for the rotor means, and further shaft means supported within the hollow space of said bearing shaft means, said further shaft means serving for the transmission of the drive for different auxiliary aggregates including supply and suction pump means and a lubricant centrifuge, said further shaft means being of hollow construction and serving simultaneously for the transportation of a fuel as well as of the returning lubricant mixed with air flowing to the centrifuge.

15. A flow machine, especially gas turbine drive unit, having a relatively stationary housing means provided with outer walls and rotor means within said housing means, and provided with hub means radially inwardly thereof, comprising:

relatively fixed hollow bearing shaft means operatively connected for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension from both sides thereof, and means including a plurality of detachably connected parts for supporting the two ends of said bearing shaft means in the radial strut means of said housing means, said parts carrying the outer bearing means for the rotor means, and further means forming at least one of channel and chambers for the supply of fresh lubricant to the rotor bearing means and for the collection of the returning lubricant flowing out of these bearing means which are provided in at least some of the detachably connected parts disposed at the ends of the bearing shaft means.

16. A flow machine, especially gas turbine drive unit, having a relatively stationary housing means provided with outer walls and rotor means within said housing means and provided with hub means radially inwardly thereof, comprising:

relatively fixed hollow bearing shaft means operatively connected for supporting thereon the rotor means, substantially radial strut means operatively connecting said bearing shaft means with the outer walls of said housing means, said bearing shaft means having in the center region thereof a cylindrical extension of substantially double-T-shape in cross section, bearing means for rotatably supporting said hub means within said extension, with the hub means extending into said extension from both sides thereof, and means including a plurality of detachably connected parts for supporting the two ends of said bearing shaft means in the radial strut means of said housing means, said parts carrying the outer bearing means for the rotor means, and further shaft means supported within the hollow space of said bearing shaft means, said further shaft means serving for the transmission of the drive for different auxiliary aggregates, the detachably connected parts within the area of one of the ends of the bearing shaft means serving for the arrangement and bearing support of further parts including a transmission having gear wheels which form a part of the drive transmission for the further shaft means.

17. A flow machine having a relatively stationary housing means and rotor means within said housing means, comprising:

relatively fixed bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts.

18. A flow machine having a relatively stationary housing means and rotor means within said housing means, comprising:

relatively fixed hollow bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, means including lubricant channels and injection nozzle means in said bearing shaft extension for the supply of fresh lubricant to some of said bearings, lubricating line means extending inside of said hollow bearing shaft means, one end of said bearing shaft means being provided with lubricating supply pump means, and said lubricating line means extending from said lubricating supply pump means to the lubricant supply channels.

19. A flow machine having a relatively stationary housing means and rotor means within said housing means, comprising:

relatively fixed bearing shaft means operatively connected with the outer walls of the housing means by way of substantially radial struts, said bearing shaft means having in the center region thereof an extention of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, said bearing shaft extension including further means forming return channel means for the returning lubricant mixed with blocking air which flows out of the rotor bearings, the hollow bearing shaft means also serving for the transportation of the blocking air, and still further means forming at least one blocking air supply line in said bearing shaft extension and terminating in blocking air distributor lines.

20. A flow machine, having a relatively stationary housing means and rotor means within said housing means, comprising:

relatively fixed bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, and further shaft means supported within said hollow space of said bearing shaft means, said further shaft means serving for the transmission of the drive for different auxiliary aggregates, said further shaft means being of hollow construction and serving simultaneously for the transportation of a fuel.

21. A flow machine, having a relatively stationary housing means and rotor means within said housing means, comprising:

relatively fixed bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, and further shaft means supported within said hollow space of said bearing shaft means, said further shaft means serving for the transmission of the drive for different auxiliary aggregates, said further shaft means being of hollow construction and serving simultaneously for the transportation of a fuel, at least some of said parts disposed at the ends of the bearing shaft means forming channels for at least one of the fresh lubricant and the returned lubricant, and some of said parts within the area of one of the ends of the bearing shaft means serving for the bearing support of a transmission which forms the drive transmission for the further shaft means.

22. A flow machine having a relatively stationary housing means and rotor means within said housing means, comprising:

relatively fixed hollow bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, means including lubricant channels and injection nozzle means in said bearing shaft extension for the supply of fresh lubricant to some of said bearings, lubricating line means extending inside of said hollow bearing shaft means, one end of said bearing shaft means being provided with lubricating supply pump means, and said lubricating line means extending from said lubricating supply pump means to the lubricant supply channels, said bearing shaft extension including further means forming return channel means for the returning lubricant mixed with blocking air which flows out of the rotor bearings, the hollow bearing shaft means also serving for the transportation of the blocking air, and still further means forming at least one blocking air supply line in said bearing shaft extension and terminating in blocking air distributor lines.

23. A flow machine having a relatively stationary housing means and rotor means within said housing means, comprising:

relatively fixed hollow bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, means including lubricant channels and injection nozzle means in said bearing shaft extension for the supply of fresh lubricant to some of said bearings, lubricating line means extending inside of said hollow bearing shaft means, one end of said bearing shaft means being provided with lubricating supply pump means, and said lubricating line means extending from said lubricating supply pump means to the lubricant supply channels, said bearing shaft extension including further means forming return channel means for the returning lubricant mixed with blocking air which flows out of the rotor bearings, the hollow bearing shaft means also serving for the transportation of the blocking air, and still further means forming at least one blocking air supply line in said bearing shaft extension and terminating in blocking air distributor lines, and further shaft means supported within said hollow space of said bearing shaft means, said further shaft means serving for the transmission of the drive for different auxiliary aggregates, said further shaft means being of hollow construction and serving simultaneously for the transportation of a fuel.

24. A flow machine having a relatively stationary housing means and rotor means within said housing means, comprising:

relatively fixed hollow bearing shaft means operatively connected with the outer walls of the housing means by way of substantially radial struts, said bearing shaft means having in the center region thereof an extension of approximately double-T-shape in axial cross section, said rotor means being provided with hub means, bearing means for rotatably supporting, on the one hand, said rotor means on said shaft means and, on the other, said hub means within said bearing shaft extension against radially inwardly directed surfaces thereof, and means including a plurality of detachably connected parts for supporting the two ends of said bearing shaft means in the radial struts, means including lubricant channels and injection nozzle means in said bearing shaft extension for the supply of fresh lubricant to some of said bearings, lubricating line means extending inside of said hollow bearing shaft means, one end of said bearing shaft means being provided with lubricating supply pump means, and said lubricating line means extending from said lubricating supply pump means to the lubricant supply channels, said bearing shaft extension including further means forming return channel means for the returning lubricant mixed with blocking air which flows out of the rotor bearings, the hollow bearing shaft means also serving for the transportation of the blocking air, and still further means forming at least one blocking air supply line in said bearing shaft extension and terminating in blocking air distributor lines, and further shaft means supported within said hollow space of said bearing shaft means, said further shaft means serving for the transmission of the drive for different auxiliary aggregates, said further shaft means being of hollow construction and serving simultaneously for the transportation of a fuel, at least some of said parts disposed at the ends of the bearing shaft means forming channels for at least one of the fresh lubricant and the returned lubricant, and some of said parts within the area of one of the ends of the bearing shaft means serving for the bearing support of a transmission which forms the drive transmission for the further shaft means.

References Cited by the Examiner

UNITED STATES PATENTS 2,411,124  11/1946  Baumann _____ 230—116

FOREIGN PATENTS 911,565  11/1962  Great Britain.

MARTIN P. SCHWADRON, *Primary Examiner.*

E. A. POWELL, *Assistant Examiner.*